United States Patent
Liou et al.

(10) Patent No.: US 12,368,489 B2
(45) Date of Patent: Jul. 22, 2025

(54) METHOD FOR CONFIGURING TCI STATES FOR UE AND UE USING THE SAME

(71) Applicant: SHARP KABUSHIKI KAISHA, Sakai (JP)

(72) Inventors: Jia-Hong Liou, Taipei (TW); Chia-Hao Yu, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 270 days.

(21) Appl. No.: 17/567,900

(22) Filed: Jan. 4, 2022

(65) Prior Publication Data
US 2022/0217695 A1 Jul. 7, 2022

Related U.S. Application Data

(60) Provisional application No. 63/133,758, filed on Jan. 4, 2021.

(51) Int. Cl.
*H04W 72/044* (2023.01)
*H04L 5/00* (2006.01)
*H04W 72/1263* (2023.01)
*H04W 72/23* (2023.01)
*H04W 80/02* (2009.01)

(52) U.S. Cl.
CPC ......... *H04W 72/046* (2013.01); *H04L 5/0051* (2013.01); *H04W 72/1263* (2013.01); *H04W 72/23* (2023.01); *H04W 80/02* (2013.01)

(58) Field of Classification Search
CPC ........... H04W 72/046; H04W 72/1263; H04W 72/23; H04W 80/02; H04L 5/0051; H04B 7/0695
See application file for complete search history.

(56) References Cited

U.S. PATENT DOCUMENTS

| | | | | |
|---|---|---|---|---|
| 2020/0029274 A1* | 1/2020 | Cheng | .................. | H04W 76/28 |
| 2021/0385057 A1* | 12/2021 | Zhou | .................. | H04B 17/336 |
| 2022/0061056 A1* | 2/2022 | Farag | .................. | H04B 7/0695 |

FOREIGN PATENT DOCUMENTS

| | | |
|---|---|---|
| CN | 110474724 | 11/2019 |
| WO | 2020033549 | 2/2020 |
| WO | 2020143909 | 7/2020 |

OTHER PUBLICATIONS

Huawei et al., "MAC CE signalling for multi-beam enhancement", 3GPP TSG-RAN WG2 Meeting#109 R2-2001196 e-Meeting, Feb. 24-Mar. 6, 2020, pp. 1-3.

(Continued)

*Primary Examiner* — Diane L Lo
(74) *Attorney, Agent, or Firm* — ScienBiziP, P.C.

(57) ABSTRACT

The disclosure provides method for configuring transmission configuration indicator (TCI) states for user equipment (UE) and UE. In the embodiments of the disclosure, the details about how to exactly use the TCI-based structure for indicating a common beam for various purposes (e.g., both DL/UL, UL (only) or DL (only)) have been introduced. In addition, the embodiments of the disclosure have proposed the exact behavior of switching different TCI state for different purpose as well. Accordingly, efficient beam indication for both DL/UL transmission, UL only transmission, and DL only transmission can be facilitated, and the procedure(s) related to seamlessly switching among different beam indication signaling are also specified.

16 Claims, 2 Drawing Sheets

(56) References Cited

OTHER PUBLICATIONS

"International Search Report (Form PCT/ISA/210) of Related International PCT Application, application No. PCT/CN2022/070140," mailed on Apr. 1, 2022, pp. 1-4.
3GPP, "Technical Specification, 3rd Generation Partnership Project; Technical Specification Group Radio Access Network; NR; NR and NG-RAN Overall Description; Stage 2 (Release 16)." 3GPP TS 38.300 V16.3.0, Sep. 2020, pp. 1-148.
3GPP, "Technical Specification, 3rd Generation Partnership Project; Technical Specification Group Radio Access Network; NR; User Equipment (UE) radio access capabilities (Release 16)." 3GPP TS 38.306 V16.2.0, Sep. 2020, pp. 1-126.
3GPP, "Technical Specification, 3rd Generation Partnership Project; Technical Specification Group Radio Access Network; NR; Medium Access Control (MAC) protocol specification (Release 16)." 3GPP TS 38.321 V16.2.1, Sep. 2020, pp. 1-154.
3GPP, "Technical Specification, 3rd Generation Partnership Project; Technical Specification Group Radio Access Network; NR; Radio Resource Control (RRC) protocol specification (Release 16)." 3GPP TS 38.331 V16.2.0, Sep. 2020, pp. 1-921.
3GPP, "Technical Specification, 3rd Generation Partnership Project; Technical Specification Group Radio Access Network; NR; Physical channels and modulation (Release 16)." 3GPP TS 38.211 V16.3.0, Sep. 2020, pp. 1-133.
3GPP, "Technical Specification, 3rd Generation Partnership Project; Technical Specification Group Radio Access Network; NR; Multiplexing and channel coding (Release 16)." 3GPP TS 38.212 V16.3.0, Sep. 2020, pp. 1-152.
3GPP, "Technical Specification, 3rd Generation Partnership Project; Technical Specification Group Radio Access Network; NR; Physical layer procedures for control (Release 16)." 3GPP TS 38.213 V16.3.0, Sep. 2020, pp. 1-179.
3GPP, "Technical Specification, 3rd Generation Partnership Project; Technical Specification Group Radio Access Network; NR; Physical layer procedures for data (Release 16)." 3GPP TS 38.214 V16.3.0, Sep. 2020, pp. 1-166.
3GPP, "RAN1 Chairman's Notes", 3GPP TSG RAN WG1 Meeting #102-e e-Meeting, Aug. 17-28, 2020, pp. 1-204.
3GPP, "RAN1 Chairman's Notes", 3GPP TSG RAN WG1 Meeting #103-e e-Meeting, Oct. 26-Nov. 13, 2020, pp. 1-230.

* cited by examiner

METHOD FOR CONFIGURING TCI STATES FOR UE AND UE USING THE SAME

CROSS-REFERENCE TO RELATED APPLICATION

This application claims the priority benefit of U.S. provisional application No. 63/133,758, filed on Jan. 4, 2021. The entirety of the above-mentioned patent application is hereby incorporated by reference herein and made a part of this specification.

BACKGROUND

1. Field of the Invention

The disclosure generally relates to a communication mechanism related to transmission configuration indicator (TCI) states, in particular, to a method for configuring TCI states for UE and UE using the same method.

2. Description of Related Art

In the field of communication, new radio (NR) has been developed over these years. For NR, especially FR2 (Frequency Ranges. 2), beamforming technology has been recognized an important method for conquering high power penetration. Hence, the beam management and beam failure recovery procedure has been developed accordingly.

Starting from Rel-15/16, NR has been defined with methods with beam indications for DL(downlink) transmission and UL(uplink) transmission. However, in Rel-15/16, beam indication for DL and UL are performed based on different structure. For DL, NR introduced a TCI state, which includes DL QCL (Quasi Co-Location) assumptions for receiving DL transmission. For UL, NR used a spatial relation signaling for transmitting PUCCH (Physical Uplink Control Channel)/SRS (Sounding Reference Signal), an SRS resource indicator for transmitting PUSCH (Physical Uplink Shared Channel).

In Rel-17, people have seen the demand of using a unified structure for indicating a common beam for DL transmission and UL transmission, a common beam for UL transmission (only) and a common beam for DL transmission (only). Hence, a TCI based structure has emerged to address the desire. However, clear details have not been found for how to exactly use the TCI-based structure for indicating a common beam for various purposes, e.g., both DL/UL, UL (only) or DL (only). In addition, the exact behavior of switching different TCI state for different purpose has not been proposed as well.

SUMMARY OF THE INVENTION

Accordingly, the disclosure is directed to a method for configuring TCI states for UE and UE using the same method, which may be used to solve the above technical problems.

The embodiments of the disclosure provide a method for configuring transmission configuration indicator (TCI) states for user equipment (UE). The method includes: receiving, by the UE, a radio resource control (RRC) configuration configuring at least one of a first set of first TCI states, a second set of second TCI states and a third set of third TCI states; receiving, by the UE, a medium access control (MAC) control element (CE), wherein the MAC CE activates a first TCI state combination or a second TCI state combination, wherein the first TCI state combination includes a part of the first TCI states, and the second TCI state combination includes at least one of the second TCI states and the third TCI states; in response to determining that the MAC CE activates the first TCI state combination, mapping, by the UE, the first TCI state combination to a plurality of codepoints of a TCI field in a downlink control information (DCI) format; in response to determining that the MAC CE activates the second TCI state combination, mapping, by the UE, the second TCI state combination to the codepoints of the TCI field in the DCI format, wherein each of the codepoints is mapped to one of the second TCI states, one of the third TCI states, or a pair of the one of the second TCI state and the one of the third TCI state; applying, by the UE, one or more TCI states indicated by the TCI field in the DCI format when or after the UE receives the DCI format.

The embodiments of the disclosure provide UE including a transceiver and a processor. The transceiver is configured to perform: receiving a radio resource control configuration configuring at least one of a first set of first transmission configuration indicator (TCI) states, a second set of second TCI states and a third set of third TCI states; receiving a medium access control (MAC) control element (CE), wherein the MAC CE activates a first TCI state combination or a second TCI state combination, wherein the first TCI state combination includes a part of the first TCI states, and the second TCI state combination includes at least one of the second TCI states and the third TCI states. The processor is coupled to the transceiver and configured to perform: in response to determining that the MAC CE activates the first TCI state combination, mapping the first TCI state combination to a plurality of codepoints of a TCI field in a downlink control information (DCI) format; in response to determining that the MAC CE activates the second TCI state combination, mapping the second TCI state combination to the codepoints of the TCI field in the DCI format, wherein each of the codepoints is mapped to one of the second TCI states, one of the third TCI states, or a pair of the one of the second TCI state and the one of the third TCI state; applying one or more TCI states indicated by the TCI field in the DCI format when or after the UE receives the DCI format.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
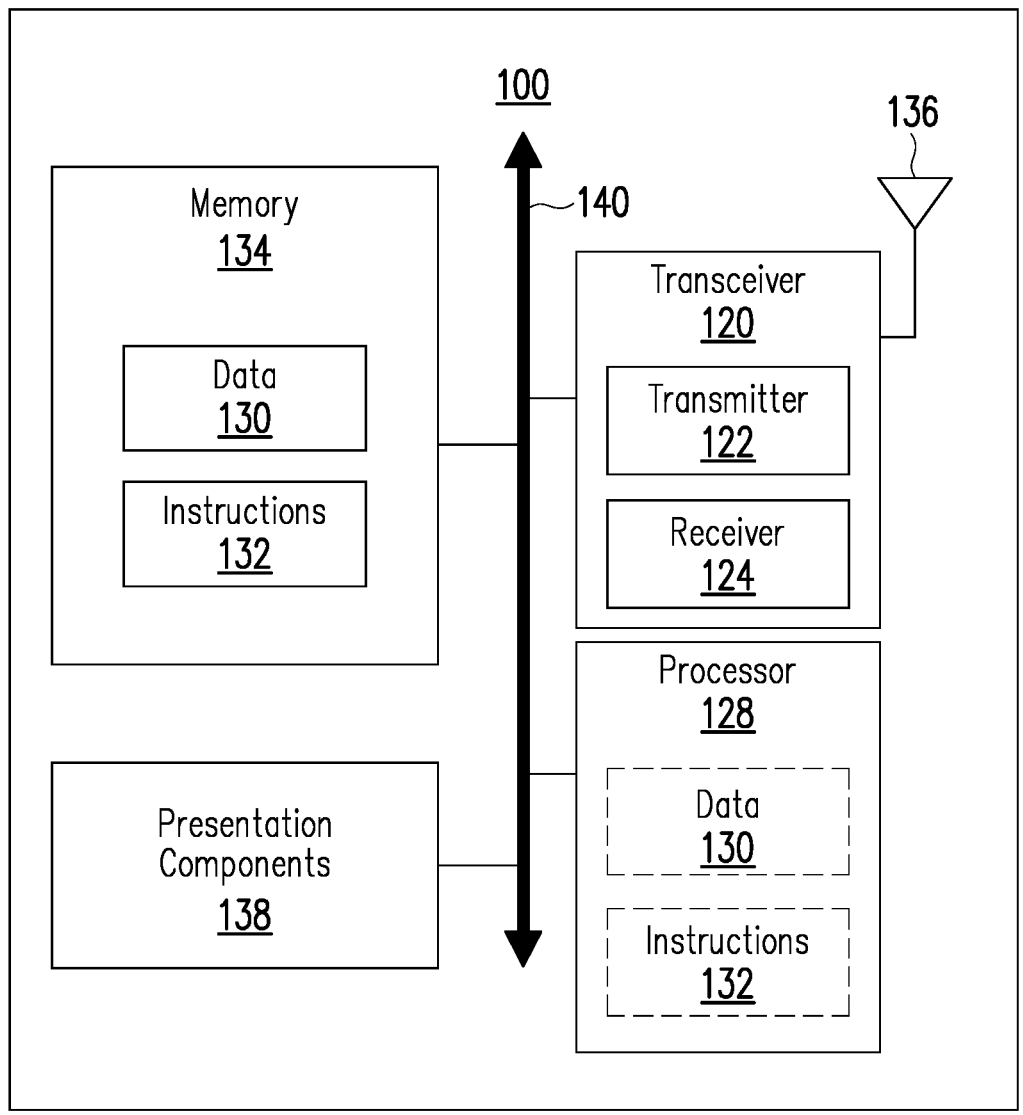
FIG. 1 illustrates a block diagram of a node for wireless communication, in accordance with various aspects of the present application.

Reference will now be made in detail to the present preferred embodiments of the invention, examples of which are illustrated in the accompanying drawings. Wherever possible, the same reference numbers are used in the drawings and the description to refer to the same or like parts.

In the disclosure, the contents in the following documents are incorporated herein by reference: (1) 3GPP TS 38.300 V16.3.0 (2020-09) 3rd Generation Partnership Project;

Technical Specification Group Radio Access Network; NR; NR and NG-RAN Overall Description; Stage 2 (Release 16); (2) 3GPP TS 38.306 V16.2.0 (2020-09) 3rd Generation Partnership Project; Technical Specification Group Radio Access Network; NR; User Equipment (UE) radio access capabilities (Release 16) (3) 3GPP TS 38.321 V16.2.1 (2020-09) 3rd Generation Partnership Project; Technical Specification Group Radio Access Network; NR; Medium Access Control (MAC) protocol specification (Release 16); (4) 3GPP TS 38.331 V16.2.0 (2020-09) 3rd Generation Partnership Project; Technical Specification Group Radio Access Network; NR; Radio Resource Control (RRC) protocol specification (Release 16); (5) 3GPP TS 38.211 V16.3.0 (2020-09) 3rd Generation Partnership Project; Technical Specification Group Radio Access Network; NR; Physical channels and modulation (Release 16); (6) 3GPP TS 38.212 V16.3.0 (2020-09) 3rd Generation Partnership Project; Technical Specification Group Radio Access Network; NR; Multiplexing and channel coding (Release 16); (7) 3GPP TS 38.213 V16.3.0 (2020-09) 3rd Generation Partnership Project; Technical Specification Group Radio Access Network; NR; Physical layer procedures for control (Release 16); (8) 3GPP TS 38.214 V16.3.0 (2020-09) 3rd Generation Partnership Project; Technical Specification Group Radio Access Network; NR; Physical layer procedures for data (Release 16); (9) RAN1 Chairman Notes from RAN1 #102(e) to RAN1 #103(e).

It is noted that any two or more than two of the following paragraphs, (sub)-bullets, points, actions, or claims described in each embodiment/implementation/concept may be combined logically, reasonably, and properly to form a specific method.

It is noted that any sentence, paragraph, (sub)-bullet, point, action, or claim described in each of the following embodiment(s)/implementation(s)/concept(s) may be implemented independently and separately to form a specific method. Dependency, e.g. "based on", "more specifically", "where" or etc., in the following embodiment(s)/implementation(s)/concept(s) is just one possible embodiment which would not restrict the specific method.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, or an LTE-Advanced Pro system) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a Radio Access Network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A base station may include, but is not limited to, a Node B (NB) as in the UMTS, an evolved Node B (eNB) as in the LTE-A, a Radio Network Controller (RNC) as in the UMTS, a Base Station Controller (BSC) as in the GSM/GERAN, an NG-eNB as in an E-UTRA base station in connection with the 5GC, a next generation Node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DownLink (DL) transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

Furthermore, some or all of the following terminology and assumption may be used hereafter.

BS (base station): a network central unit or a network node in NR which is used to control one or multiple TRPs (transmission and reception point) which are associated with one or multiple cells. Communication between BS and TRP(s) is via fronthaul. BS may be referred to as central unit (CU), eNB, gNB, or NodeB.

TRP: a transmission and reception point provides network coverage and directly communicates with UEs. TRP may be referred to as distributed unit (DU) or network node.

Cell: a cell is composed of one or multiple associated TRPs, i.e., coverage of the cell is composed of coverage of all associated TRP(s). One cell is controlled by one BS. Cell may be referred to as TRP group (TRPG).

Serving beam: serving beam for a UE is a beam generated by a network node, e.g. TRP, which is configured to be used to communicate with the UE, e.g. for transmission and/or reception.

Candidate beam: candidate beam for a UE is a candidate of a serving beam. Serving beam may or may not be candidate beam.

EDT (Early Data Transmission): Allows one uplink data transmission optionally followed by one downlink data transmission during the random access procedure as specified in TS 36.300 [9]. The SI connection is established or resumed upon reception of the uplink data and may be released or suspended along with the transmission of the downlink data. Early data transmission refers to both CP (cyclic prefix)-EDT and UP-EDT.

Transmission using PUR: Allows one uplink data transmission using preconfigured uplink resource from RRC_IDLE mode as specified in TS 36.300. Transmission using PUR (Preconfigured UL Resource) refers to both CP transmission using PUR and UP transmission using PUR.

A UE may be configured with and/or served by a network in a serving cell. The UE may (be configured to) communicate with the network in the serving cell. The UE may be configured with one or more serving cells, which may include the serving cell. The UE may be activated or be indicated to activate one or more serving cells, which may include the serving cell. The UE may be configured and/or indicated one or more BWP. The UE may be indicated and/or configured a BWP (in the serving cell). Preferably, the BWP may be activated as an active BWP. Preferably, the BWP may be referred to an active BWP.

Preferably, the BWP may be an active DL BWP. Preferably, the BWP may be an active UL BWP. Preferably, the BWP may be an initial BWP. Preferably, the BWP may be a default BWP. Preferably, the BWP may be a dormant BWP.

Preferably, the UE may be in RRC_CONNECTED state. Preferably, the UE may be in RRC_INACTIVE state. Preferably, the UE may be in RRC_IDLE state. Preferably, the UE may perform DL reception from and/or UL transmission to a first TRP. Preferably, the UE may perform DL reception from and/or UL transmission to a second TRP.

Preferably, the first TRP may be located in the serving cell. Preferably, the second TRP may be located in the serving cell. Preferably, the second TRP may be located in a neighboring cell or a non-serving cell.

Preferably, the UE may include or be equipped with one or more panels. Preferably, some or all of the one or more panels may be used and/or activated for DL reception (performed at the same time or same time interval). Preferably, some or all of the one or more panels may be used and/or activated for UL transmission (performed at the same time or same time interval). Preferably, the set of used and/or activated panels for DL reception may be (partially) the same as the set of used and/or activated panels for UL transmission. Preferably, the set of used and/or activated panels for DL reception may be (partially) different from the set of used and/or activated panels for UL transmission.

Preferably, the UE may be configured, indicated or may derive one or more (value of) TRP identifier. Preferably, a TRP identifier may be associated with a TRP. Preferably, a DL transmission associated with a TRP identifier may mean that the DL transmission may be transmitted form a TRP or a CORESET associated with the TRP identifier. Preferably, a UL transmission associated with a TRP identifier may mean that the UL transmission may be transmitted to a TRP associated with the TRP identifier. Preferably, a TRP identifier may be associated with a CORESETPoolIndex, or a value (candidate) of a CORESETPoolIndex.

Preferably, the UE may be configured, indicated or may derive one or more panel identifier(s). Preferably, a panel identifier may be associated with a panel (of the UE). Preferably, a DL transmission associated with a panel identifier may mean that the DL transmission may be received by a (DL) panel associated with the panel identifier. Preferably, a UL transmission associated with a panel identifier may mean the UL transmission may be transmitted by a (UL) panel associated with the panel identifier. Preferably, a panel identifier may be associated with a SRS resource set index, or a (candidate) value of a SRS resource set index.

Preferably, the UE may be configured, indicated or may derive a first TRP identifier. Preferably, the UE may be configured, indicated or may derive a second TRP identifier. Preferably, the UE may be configured, indicated or may derive a first panel identifier. Preferably, the UE may be configured, indicated or may derive a second panel identifier.

In the embodiments of the disclosure, a joint/common TCI state may be referred to or replaced with at least one of the following: a beam applicable for both DL and UL transmission, e.g., DL or UL channel, DL or UL RS; spatial filter for transmission and/or reception; spatial parameters for transmission and/or reception; spatial relationship for transmission and/or reception; spatial assumption for transmission and/or reception.

In the embodiments of the disclosure, a UL or UL-only TCI state may be referred to or replaced with at least one of the following: UL beam; Spatial relation; spatial transmission filter; transmission precoder; spatial parameters; spatial relationship.

In the embodiments of the disclosure, a DL or DL-only TCI state may be referred to or replaced with at least one of the following: a TCI (only) applicable for DL channel(s) or RS(s); a TCI associated with QCL type-D; QCL assumption; DL beam; spatial reception filter; spatial parameters; spatial relationship; spatial assumption.

In the embodiments of the disclosure, a TCI state pool (e.g., joint TCI pool, UL-only TCI state pool, DL-only TCI state pool) may be referred to or stand for a (RRC) configuration or a list, which may include or contain one or more TCI state (index).

In the embodiments of the disclosure, an expression of "X/Y" may include meaning of "X or Y". In the embodiments of the disclosure, an expression of "X/Y" may include meaning of "X and Y". In the embodiments of the disclosure, an expression of "X/Y" may include meaning of "X and/or Y". In the embodiments of the disclosure, an expression of "(A) B" or "B (A)" may include concept of "only B". In the embodiments of the disclosure, an expression of "(A) B" or "B (A)" may include concept of "A+B" or "B+A".

In the embodiments of the disclosure, a panel could mean that an antenna (port) group or an antenna (port) set. A panel could mean that a cluster of transceiver units, which could generate an analog beam. There may be more than one DL/UL beams associated with one panel. When one transmitting node (UE or NW) is performing a transmission via a panel, only one beam associated with the panel could be used to perform the transmission. For a transmitter comprising more than one panels, e.g., two panels, it may happen that two beams associated with the two panels respectively are used to perform a transmission.

In the embodiments of the disclosure, a TRP identifier could mean or be referred to a (candidate) value of a TRP identifier. The first TRP identifier could be a first candidate value of a TRP identifier or a first TRP identifier value. The second TRP identifier could be a second candidate value of a TRP identifier or a second TRP identifier value.

In the embodiments of the disclosure, a panel identifier could mean or be referred to a (candidate) value of a panel identifier. The first panel identifier could be a first candidate value of a panel identifier or a first panel identifier value. The second panel identifier could be a second candidate value of a panel identifier or a second panel identifier value.

In the embodiments of the disclosure, when a procedure or description is related to a serving cell, it may mean the procedure or description is related to an active (DL/UL) BWP in the serving cell.

It is noted that some or all of the above embodiments could be jointly combined or formed to be a new or another one embodiment.

It is noted that the above embodiments can be used to solve at least (but not limited to) the issue mentioned above.

In some embodiments, a UE may monitor and/or receive one or more beam indication(s). A beam indication may carry or indicate a TCI field. A beam indication may be a (scheduling) DCI. In one embodiment, the UE may monitor and/or receive one or more joint TCI. The UE may monitor and/or receive one or more UL TCI. The UE may monitor and/or receive one or more DL TCI.

In one embodiment, a beam indication may be or may include or may indicate at least one of the followings: a beam indication applied for both receiving DL transmission and/or transmitting UL transmission; a beam indication applied for (only) transmitting UL transmission; or a beam indication applied for (only) receiving DL transmission.

In one embodiment, a beam indication applied for both receiving DL transmission and/or transmitting UL transmission may be derived from or associated with at least one of the followings: a joint TCI state.

In one embodiment, a beam indication applied for (only) transmitting UL transmission may be derived from or associated with at least one of the followings: a UL-only TCI state, and/or a joint TCI state, and/or a DL-only TCI state.

In the embodiment where the beam indication applied for (only) transmitting UL transmission may be derived from or associated with the joint TCI state, the UE may discard/ignore DL RX parameters obtained from the joint TCI state. Preferably, the UE may derive, from a joint TCI state, a beam indication applied for (only) transmitting UL transmission, when (or if) being indicated by a higher layer signaling (e.g., MAC CE, RRC).

In one embodiment, a beam indication applied for (only) receiving DL transmission may be derived from or associated with at least one of the followings: a DL-only TCI state, and/or a joint TCI state, and/or a UL-only TCI state.

In the embodiment where the beam indication applied for (only) receiving DL transmission may be derived from or associated with the joint TCI state, the UE may discard/ignore UL TX parameters obtained from the joint TCI state. Preferably, the UE may derive, from a joint TCI state, a beam indication applied for (only) receiving DL transmission, when (or if) being indicated by a higher layer signaling (e.g., MAC CE, RRC).

In one embodiment, a beam indication applied for both receiving DL transmission and/or transmitting UL transmission may be, for example (not intended for being limited to), applicable to one or a combination of the following DL transmission and UL transmission: PDSCH; PDSCH scheduled by CORESET #0; PDSCH exclusive of those scheduled by CORESET #0; PDCCH; PDCCH from CORESET #0; PDCCH exclusive of those from CORESET #0; PDCCH not for carrying feedback/acknowledge information; DL RS (e.g., DMRS, PTRS, CSI-RS, PRS, SSB); PUSCH; PUSCH carrying certain UCI (e.g., HARQ-ACK); PUSCH not carrying certain UCI (e.g., HARQ-ACK); PUCCH; PUCCH carrying certain UCI (e.g., HARQ-ACK); PUCCH not carrying certain UCI (e.g., HARQ-ACK); UL RS (e.g., DMRS, PTRS, SRS, PRS); PRACH.

In one embodiment, a beam indication applied for (only) transmitting UL transmission may be, for example (not intended for being limited to), applicable to one or a combination of the following UL transmission: PUSCH; PUSCH carrying certain UCI (e.g., HARQ-ACK); PUSCH not carrying certain UCI (e.g., HARQ-ACK); PUCCH; PUCCH carrying certain UCI (e.g., HARQ-ACK); PUCCH not carrying certain UCI (e.g., HARQ-ACK); UL RS (e.g., DMRS, PTRS, SRS, PRS); PRACH.

In one embodiment, a beam indication applied for (only) receiving DL transmission may be, for example (not intended for being limited to), applicable to one or a combination of the following DL transmission: PDSCH; PDSCH scheduled by CORESET #0; PDSCH exclusive of those scheduled by CORESET #0; PDCCH; PDCCH from CORESET #0; PDCCH exclusive of those from CORESET #0; PDCCH not for carrying feedback/acknowledge information; DL RS (e.g., DMRS, PTRS, CSI-RS, PRS, SSB).

In one embodiment, a joint TCI state may indicate or include one or more RX parameters for receiving DL transmission and/or one or more TX parameters for transmitting UL transmission.

Preferably, a joint TCI state may include/indicate/provide at least a first RS.

Preferably, the first RS in a joint TCI state may be used to derive an DL/UL beam or spatial relation or spatial parameter for transmitting UL transmission and/or receiving DL transmission.

In one embodiment, the joint TCI state may be applied for receiving one or more DL channels and/or one or more DL signals.

In one embodiment, the joint TCI state may be applied for transmitting one or more UL channels and/or one or more UL signals.

In one embodiment, the joint TCI may indicate the UE to use the same spatial parameters for receiving one or more DL channels/signals and for transmitting one or more UL channels/signals.

In one embodiment, the UE may be configured one or more joint TCI state(s). The UE may receive a first MAC CE.

In one embodiment, the first MAC CE may be used/applied for activating a multiple of joint TCI states(s) among the one or more joint TCI state(s).

In one embodiment, the first MAC CE may be used/applied for indicating that a multiple of joint TCI states among the one or more joint TCI state(s) map to one or a multiple of TCI codepoints in a TCI field of a DCI.

In one embodiment, the first MAC CE may be used/applied for indicating that a multiple of joint TCI states among the one or more joint TCI state(s) can be used/applied for receiving DL transmission and/or transmitting UL transmission (if further indicated).

In one embodiment, a UL-only TCI state may indicate or include one or more TX parameters (only) for transmitting UL transmission.

Preferably, a UL-only TCI state may include/indicate/provide at least a second RS.

Preferably, the second RS in a UL-only TCI state may be used to derive an UL beam or spatial relation or spatial parameter for transmitting UL transmission (and preferably receiving DL transmission).

In one embodiment, the UL-only TCI state may be applied for transmitting one or more UL channels and/or one or more UL signals.

When indicated a UL-only TCI state, it may mean that the UE uses or applies different spatial parameters for receiving one or more DL channels/signals and for transmitting one or more UL channels/signals. Optionally, such separate UL/DL spatial parameters are applied when joint TCI state and UL-only TCI state are indicated at the same time or sequentially. Optionally, such separate UL/DL spatial parameters are applied when DL-only TCI state and UL-only TCI state are indicated at the same time or sequentially.

In one embodiment, the UE may be configured one or more UL-only TCI state(s). The UE may receive a second MAC CE.

In one embodiment, the second MAC CE may be used/applied for activating a multiple of UL-only TCI states(s) among the one or more UL-only TCI state(s).

In one embodiment, the second MAC CE may be used/applied for indicating that a multiple of UL-only TCI states among the one or more UL-only TCI state(s) map to a multiple of TCI codepoints in a TCI field of a DCI.

In one embodiment, the second MAC CE may be used/applied for indicating that a multiple of UL-only TCI states among the one or more UL-only TCI state(s) can be used/applied for transmitting UL transmission (if further indicated).

In one embodiment, a DL-only TCI state may indicate or include one or more RX parameters (only) for receiving DL transmission.

Preferably, a DL-only TCI state may include/indicate/provide at least a third RS.

Preferably, the third RS in a DL-only TCI state may be used to derive a DL beam or spatial relation or spatial parameter for receiving DL transmission (and preferably transmitting UL transmission).

In one embodiment, the DL-only TCI state may be applied for receiving one or more DL channels and/or one or more DL signals.

When indicated a DL-only TCI state, it may mean that the UE uses or applies different spatial parameters for receiving one or more DL channels/signals and for transmitting one or more UL channels/signals. Optionally, such separate UL/DL spatial parameters are applied when joint TCI state and DL-only TCI state are indicated at the same time or sequentially. Optionally, such separate UL/DL spatial parameters are applied when DLTCI state and UL-only TCI state are indicated at the same time or sequentially.

In one embodiment, the UE may be configured one or more DL-only TCI state(s). The UE may receive a third MAC CE.

In one embodiment, the third MAC CE may be used/applied for activating a multiple of DL-only TCI states(s) among the one or more DL-only TCI state(s).

In one embodiment, the third MAC CE may be used/applied for indicating that a multiple of DL-only TCI states among the one or more DL-only TCI state(s) map to a multiple of TCI codepoints in a TCI field of a DCI.

In one embodiment, the third MAC CE may be used/applied for indicating that a multiple of DL-only TCI states among the one or more joint TCI state(s) can be used/applied for receiving DL transmission and/or transmitting UL transmission (if further indicated).

Preferably, two or all of the followings may be the same MAC CE or the same MAC CE format: the first MAC CE; the second MAC CE; the third MAC CE.

Preferably, the first RS may be one or some of the followings: SSB, and/or; CSI-RS, and/or; CSI-RS for tracking, and/or; CSI-RS for computing L1-RSRP and/or L1-SINR, and/or; CSI-RS for mobility, and/or; DL PRS, and/or; SRS, and/or; SRS for beam management, and/or; SRS for codebook based transmission, and/or; SRS for non-codebook based transmission, and/or; SRS for antenna switching, and/or; SRS for carrier switching, and/or; UL PRS, and/or; UL DMRS, and/or; UL PTRS.

Preferably, the second RS may be one or some of the followings: SSB, and/or; CSI-RS, and/or; CSI-RS for tracking, and/or; CSI-RS for computing L1-RSRP and/or L1-SINR, and/or; CSI-RS for mobility, and/or; DL PRS, and/or; SRS, and/or; SRS for beam management, and/or; SRS for codebook based transmission, and/or; SRS for non-codebook based transmission, and/or; SRS for antenna switching, and/or; SRS for carrier switching, and/or; UL PRS, and/or; UL DMRS, and/or; UL PTRS.

Preferably, the third RS may be one or some of the followings: SSB, and/or; CSI-RS, and/or; CSI-RS for tracking, and/or; CSI-RS for computing L1-RSRP and/or L1-SINR, and/or; CSI-RS for mobility, and/or; DL PRS, and/or; SRS, and/or; SRS for beam management, and/or; SRS for codebook based transmission, and/or; SRS for non-codebook based transmission, and/or; SRS for antenna switching, and/or; SRS for carrier switching, and/or; UL PRS, and/or; UL DMRS, and/or; UL PTRS.

In one embodiment, the one or more RX parameters may include information related to QCL assumption and/or spatial parameter/relation (which may be used as beam indication, or channel characteristics derivation, e.g., Doppler shift, Doppler delay, average delay, delay spread).

In one embodiment, the one or more TX parameters may include information related to QCL assumption and/or spatial parameter/relation (which may be used as UL beam indication), UL power control, pathloss RS, UL timing/TA, information/identifier related to transmitting panel.

In one embodiment, the UE may be configured a joint TCI state pool.

In one embodiment, the joint TCI state pool may include/include one or more joint TCI states.

In one embodiment, the UE may be configured a UL-only TCI state pool.

In one embodiment, the UL-only TCI state pool may include/include one or more UL-only TCI states. The UE may be configured a UL-only TCI state pool, where at least one beam indication applied for (only) transmitting UL transmission is not derived from joint TCI state(s).

In one embodiment, the UE may be configured a DL-only TCI state pool.

In one embodiment, the DL-only TCI state pool may include/include one or more DL-only TCI states. The UE may be configured a DL-only TCI state pool, where at least one beam indication applied for (only) receiving DL transmission is not derived from joint TCI state(s).

Preferably, the type of the second RS in the UL-only TCI state may (only allowed to) be a second UL RS. Preferably, the UE may not expect to be indicated/configured that a UL-only TCI state pool includes a UL-only TCI state indicating/comprising/providing the second RS, where the second RS is not set as the second UL RS.

Preferably, the network may not (be allowed to) indicate/configure the UE that a UL-only TCI state pool includes a UL-only TCI state indicating/comprising/providing the second RS, where the second RS is not set as the second UL RS.

In some embodiments when (or if) any of the conditions is satisfied: (1) the joint TCI state pool and the UL-only TCI state pool are the same, and/or (2) the UL-only TCI state pool is a subset of the joint TCI state pool, and/or (3) the joint TCI state pool include the UL-only TCI state pool, any of the following operation can be performed: (1) the type of the RS in the UL-only TCI state may (only allowed to) be SRS; (2) the UE may not expect to be indicated/configured that a UL-only TCI state pool includes a UL-only TCI state indicating/comprising/providing the second RS, where the second RS is not set as the second UL RS; (3) the network may not (be allowed to) indicate/configure the UE that a UL-only TCI state pool includes a UL-only TCI state indicating/comprising/providing the second RS, where the second RS is not set as the second UL RS.

In one embodiment, the second UL RS may be at least one of the followings: SRS, and/or; SRS for beam management, and/or; SRS for codebook based transmission, and/or; SRS for non-codebook based transmission, and/or; SRS for antenna switching, and/or; SRS for carrier switching, and/or; SRS for CLI, and/or; UL PRS, and/or; UL DMRS, and/or; UL PTRS.

Preferably, the first RS in the joint TCI state may not (be allowed to) be a first UL RS.

Preferably, when (or if) a joint TCI state is used/applied for both receiving DL transmission and/or transmitting UL transmission, the first RS in the joint TCI state may not (be allowed to) be a first UL RS.

Preferably, when (or if) a joint TCI state is used/applied for (only) receiving DL transmission, the first RS in the joint TCI state may not (be allowed to) be a first UL RS.

Preferably, when (or if) the first RS in the joint TCI state is a first UL RS, the joint TCI state may not (be allowed to) be used/applied for both receiving DL transmission and/or transmitting UL transmission.

Preferably, when (or if) the first RS in the joint TCI state is a first UL RS, the joint TCI state may not (be allowed to) be used/applied for (only) receiving DL transmission.

Preferably, the first UL RS may be at least one of the followings: SRS, and/or; SRS for beam management, and/or; SRS for codebook based transmission, and/or; SRS for non-codebook based transmission, and/or; SRS for antenna switching, and/or; SRS for carrier switching, and/or; UL PRS, and/or; UL DMRS, and/or; UL PTRS When or upon the UE receives a beam indication, the UE may determine the purpose/type of the beam indication.

For example, the UE may determine the received beam indication is applied for both receiving DL transmission and/or for transmitting UL transmission, preferably based on a rule or other indication.

For example, the UE may determine the received beam indication is applied (only) for transmitting UL transmission, preferably based on a rule or other indication.

For example, the UE may determine the received beam indication is applied (only) for receiving DL transmission, preferably based on a rule or other indication.

The UE may receive a beam indication in slot p. The UE may receive a beam indication in slot q. Preferably, slot q is located after slot p. There may not be other beam indication received or transmitted between slot p and slot q. The UE may not expect that the beam indication in slot q is or indicates a TCI state applied for (only) receiving DL transmission, when (or if) the beam indication in slot p is or indicates a TCI state applied for both receiving DL transmission and/or transmitting UL transmission. Slot p and slot q can be referred to or replaced with other time scale unit, e.g., mini-slot, subframe or symbol.

In one embodiment, the UE may be configured and/or activated a first serving cell. The UE may be configured and/or activated a second serving cell. The UE may monitor and/or receive the beam indication in the first serving cell. The beam indication may be applied for the second serving cell.

How UE determines the second serving cell may be according to one or combination of the followings: a scheduled serving cell of a scheduled PDSCH or PUSCH or DL/UL RS transmission by the DCI associated with the beam indication, if the beam indication schedules one, and/or; a scheduled serving cell, if the beam indication schedules PDSCH or PUSCH or DL/UL RS transmission, where the scheduled serving cell may be indicated by the beam indication, and/or; (indicated value) of a carrier indicator field (CIF).

In one embodiment, a carrier indicator field may indicate which serving cell is the second serving cell. A carrier indicator field may indicate which serving cell is the second serving cell, when the beam indication does not schedule a PDSCH or a PUSCH or a DL/UL transmission.

In one embodiment, after or upon the UE receives or is indicated a TCI state (or beam indication) applied for both receiving DL transmission and/or transmitting UL transmission, the UE may apply the TCI state (or beam indication) applied for both receiving DL transmission and/or transmitting UL transmission. In one embodiment, the UE may start from the first/earliest (available) DL/UL slot that is after slot or symbol n1 plus a first application time.

In one embodiment, after or upon the UE receives or is indicated a TCI state (or beam indication) applied for (only) transmitting UL transmission, the UE may apply the TCI state applied for (only) transmitting UL transmission. In one embodiment, the UE may start from the first/earliest (available) DL/UL slot that is after slot or symbol n2 plus a second application time.

In one embodiment, after or upon the UE receives or is indicated a TCI state (or beam indication) applied for (only) receiving DL transmission, the UE may apply the TCI state (or beam indication) applied for (only) receiving DL transmission. In one embodiment, the UE may start from the first/earliest (available) DL/UL slot that is after slot or symbol n3 plus a third application time.

In one embodiment, slot or symbol n1 may be a slot or symbol, where the UE performs: (1) receiving the TCI state (or beam indication) applied for both receiving DL transmission and/or transmitting UL transmission, and/or (2) transmitting the acknowledgement of the TCI state (or beam indication) applied for both receiving DL transmission and/or transmitting UL transmission.

In one embodiment, slot or symbol n2 may be a slot or symbol, where the UE performs: (1) receiving the TCI state (or beam indication) applied for (only) transmitting UL transmission, and/or (2) transmitting the acknowledgement of the TCI state (or beam indication) applied for (only) transmitting UL transmission.

In one embodiment, slot or symbol n3 may be a slot or symbol, where the UE performs: (1) receiving the TCI state (or beam indication) applied for (only) receiving DL transmission, and/or (2) transmitting the acknowledgement of the TCI state (or beam indication) applied for (only) receiving DL transmission.

In one embodiment, the first application time may be associated with or derived from the second application time and the third application time. For example, the first application time may be maximum (the first application time, the second application time).

In one embodiment, when (or if) a beam indication is associated with a TRP related identifier (value) and carried/scheduled by a PDCCH associated with a TRP related identifier (value), the UE may (only) apply the beam indication for receiving DL transmission and/or transmitting UL transmission, where the DL transmission and/or UL transmission are associated with the same TRP related identifier (value).

In the embodiments of the disclosure, how the UE determines the purpose of the received beam indication can be performed by at least one or a combination of the following concepts or implementations.

In an implementation 1 of the disclosure, a beam indication may be a DCI format. The beam indication may be at least one of the followings: DCI format 1_1; DCI format 1_2; DCI format 0_1; DCI format 0_2; DCI format 1_0; DCI format 0_0; a common or group common DCI format.

In one embodiment, the DCI format may include or indicate a TCI field or a TCI state value. In one embodiment, the DCI format may include or indicate a field.

In one embodiment, the field may indicate to which TCI state pool the TCI field is referring/mapping. For example, the field may indicate that the TCI field refers or maps to (activated) TCI states from a joint TCI state pool. For example, the field may indicate that the TCI field refers or maps to (activated) TCI states from a UL-only TCI state pool. For example, the field may indicate that the TCI field refers or maps to (activated) TCI states from a DL-only TCI state pool.

In one embodiment, the field may indicate the purpose of the indicated TCI state value.

In one embodiment, the field may indicate the indicated TCI state value is used for both receiving DL transmission and transmitting UL transmission. The field may indicate the indicated TCI state value is used for (only) transmitting UL transmission. The field may indicate the indicated TCI state value is used for (only) receiving DL transmission.

In one embodiment, the field may be a one-bit or two-bit field. In one embodiment, the field may be a field prior to the TCI field. In one embodiment, the field may be a sub-field in the TCI field. In one embodiment, the field may be one or more bit(s) in the TCI field.

In an implementation 2 of the disclosure, the beam indication may be at least one of the followings: DCI format 1_1; DCI format 1_2; DCI format 0_1; DCI format 0_2; DCI format 1_0; DCI format 0_0; a common or group common DCI format.

In one embodiment, the DCI format may include or indicate a TCI field or a TCI state value.

In one embodiment, the UE may receive a higher layer signaling (e.g., MAC CE, or RRC configuration).

In one embodiment, the higher layer signaling may indicate the type of TCI state pool, where (TCI field(s) in) subsequent received beam indication(s) are referring/mapping to. The higher layer signaling may indicate the purpose of TCI state indicated by subsequent received beam indication(s). TCI field(s) in the DCI format may refer/map to joint TCI state pool. TCI field(s) in the DCI format may refer/map to UL-only TCI state pool. TCI field(s) in the DCI format may refer/map to DL-only TCI state pool.

For example, when indicated "joint mode", TCI field(s) may refer/map to joint TCI state pool. For example, when indicated "UL mode", TCI field(s) may refer/map to UL-only TCI state pool (or joint TCI state pool). For example, when indicated "DL mode", TCI field(s) may refer/map to DL-only TCI state pool (joint TCI state pool). For example, when indicated "separate mode", TCI field(s) may refer/map to either DL-only TCI state pool or UL-only TCI state pool. For example, when indicated "separate mode", TCI field(s) may refer/map to either joint TCI state pool or UL-only TCI state pool. For example, when indicated "separate mode", TCI field(s) may refer/map to either joint TCI state pool or DL-only TCI state pool. These examples and indicated values are exemplary and should not be considered limited cases.

In one embodiment, the effect of the higher layer signaling may last or continue until the next one higher layer signaling with the same purpose.

In one embodiment, a subsequent (received) beam indication may mean or be referred to a beam indication received after the higher lay signaling.

In one embodiment, a subsequent (received) beam indication may mean or be referred to a beam indication received during a time duration that the higher layer signaling is effective.

In one embodiment, when (or if) any of the following conditions is satisfied: (1) the higher layer signaling indicates "joint mode", and/or (2) the higher layer signaling indicates that TCI states indicated by the subsequent beam indication(s) are applied for both DL reception and UL transmission, and/or (3) the higher layer signaling indicates a joint TCI state pool, the UE may perform: (1) applying indicated TCI state(s) from subsequent beam indication(s) for receiving DL transmission and/or transmitting UL transmission; (2) determining that TCI field(s) indicated/included in subsequent beam indication(s) are referring/mapping to (activated) TCI state(s) in a joint TCI state pool.

In one embodiment, when (or if) any of the following conditions is satisfied: (1) the higher layer signaling indicates "separate mode" or "UL mode", and/or (2) the higher layer signaling indicates that TCI states indicated by the subsequent beam indication(s) are applied for (only) UL transmission, and/or (3) the higher layer signaling indicates a joint TCI state pool or a UL-only TCI state pool, the UE may perform: (1) applying indicated TCI state(s) from subsequent beam indication(s) for (only) transmitting UL transmission; (2) determining that TCI field(s) indicated/included in subsequent beam indication(s) are referring/mapping to (activated) TCI state(s) in a UL-only TCI state pool (if the higher layer indicates a UL-only TCI state pool); (3) determining that TCI field(s) indicated/included in subsequent beam indication(s) are referring/mapping to (activated) TCI state(s) in a joint TCI state pool (if the higher layer indicates a joint TCI state pool). In the embodiment where the UE determines that TCI field(s) indicated/included in subsequent beam indication(s) are referring/mapping to (activated) TCI state(s) in a joint TCI state pool (if the higher layer indicates a joint TCI state pool), the UE may discard/ignore DL RX parameters obtained from TCI state(s) indicated by subsequent beam indication(s).

In one embodiment, when (or if) any of the following conditions is satisfied: (1) the higher layer signaling indicates "separate mode" or "UL mode", and/or (2) the higher layer signaling indicates that TCI states indicated by the subsequent beam indication(s) are applied for (only) UL transmission, and/or (3) the higher layer signaling does not indicate the type of TCI state pool, the UE may: (1) be indicated by subsequent beam indication(s) the type of TCI state pool, where TCI field(s) indicated by subsequent beam indication(s) is referring or mapping to, and/or (2) discard/ignore DL RX parameters obtained from TCI state(s) indicated by subsequent beam indication(s), if the beam indication indicates that a joint TCI state pool.

In one embodiment, when (or if) any of the following conditions is satisfied: (1) the higher layer signaling indicates "separate mode", and/or (2) the higher layer signaling does not indicate "UL mode" nor "DL mode", and/or (3) the higher layer signaling does not indicate that TCI states indicated by the subsequent beam indication(s) are applied for (only) UL transmission or for (only) DL transmission, and/or (4) the higher layer signaling does not indicate the type of TCI state pool, the UE may: (1) be indicated by subsequent beam indication(s) "UL mode", and/or (2) be indicated by subsequent beam indication(s) the type of TCI state pool, where TCI field(s) indicated by subsequent beam indication(s) is referring or mapping to, and/or (3) discard/ignore DL RX parameters obtained from TCI state(s) indicated by subsequent beam indication(s), if the beam indication indicates that a joint TCI state pool.

In one embodiment, when (or if) any of the following conditions is satisfied: (1) the higher layer signaling indicates "separate mode" or "DL mode", and/or (2) the higher layer signaling indicates that TCI states indicated by the subsequent beam indication(s) are applied for (only) DL reception; (3) the higher layer signaling indicates a joint TCI state pool or a DL-only TCI state pool, the UE may perform: (1) applying indicated TCI state(s) from subsequent beam indication(s) for (only) receiving DL transmission; (2) determining that TCI field(s) indicated/included in subsequent beam indication(s) are referring/mapping to (activated) TCI state(s) in a DL-only TCI state pool (if the higher layer indicates that a DL-only TCI state pool); (3) determining that TCI field(s) indicated/included in subsequent beam indication(s) are referring/mapping to (activated) TCI state(s) in a joint TCI state pool (if the higher layer indicates a joint TCI state pool). In the embodiment where the UE determines that TCI field(s) indicated/included in subsequent beam indication(s) are referring/mapping to (activated) TCI state(s) in a joint TCI state pool (if the higher layer indicates a joint TCI state pool), the UE may discard/ignore UL TX parameters obtained from TCI state(s) indicated by subsequent beam indication(s).

In one embodiment, when (or if) any of the following conditions is satisfied: (1) the higher layer signaling indicates "separate mode" or "DL mode", and/or (2) the higher layer signaling indicates that TCI states indicated by the subsequent beam indication(s) are applied for (only) DL reception, and/or (3) the higher layer signaling does not indicate the type of TCI state pool, the UE may: (1) be indicated by subsequent beam indication(s) the type of TCI state pool, where TCI field(s) indicated by subsequent beam indication(s) is referring or mapping to, and/or (2) discard/ignore UL TX parameters obtained from TCI state(s) indicated by subsequent beam indication(s), if the beam indication indicates that a joint TCI state pool.

In one embodiment, when (or if) any of the following conditions is satisfied: (1) the higher layer signaling indicates "separate mode", and/or (2) the higher layer signaling does not indicate "UL mode" nor "DL mode", and/or (3) the higher layer signaling does not indicate that TCI states indicated by the subsequent beam indication(s) are applied for (only) UL transmission nor for (only) DL transmission, and/or (4) the higher layer signaling does not indicate the type of TCI state pool, the UE may: (1) be indicated by subsequent beam indication(s) "DL mode", and/or (2) be indicated by subsequent beam indication(s) the type of TCI state pool, where TCI field(s) indicated by subsequent beam indication(s) is referring or mapping to, and/or (3) discard/ignore UL TX parameters obtained from TCI state(s) indicated by subsequent beam indication(s), if the beam indication indicates that a joint TCI state pool.

In one embodiment, there may be a field in the beam indication (e.g., prior to the TCI field) or a sub-field in the TCI field (e.g., in the front of the TCI field), where the field or the sub-field can be used or serve as: (1) indicating TCI states with considering the TCI field or the remaining of the TCI field, and/or (2) being absent or reserved field (when certain condition is satisfied), and/or (3) indicating type of TCI state pool, where the TCI field is referring or mapping to.

In one embodiment, the UE may derive or determine a first bit-length, where the first bit-length is total bit length of the field plus the TCI field (or bit length of the TCI field, i.e., the sub-field plus the remaining of the TCI field), when (or if) the MAC CE indicates "joint mode", or indicates that TCI states indicated by the subsequent beam indication(s) are applied for both DL reception and UL transmission.

In one embodiment, the UE may derive or determine a second bit-length, where the second bit-length is total bit length of the field plus the TCI field (or bit length of the TCI field, i.e., the sub-field plus the remaining of the TCI field), when (or if) the MAC CE indicates "separate mode", or indicates that TCI states indicated by the subsequent DCI formats are applied for (only) DL reception or (only) for UL transmission.

In one embodiment, the first bit-length and the second bit-length may be derived or determined under assumption of the same DCI format.

Alternatively or preferably, the first bit-length and/or the second bit-length may be indicated or specified.

In one embodiment, the UE may expect that the first bit-length and the second bit-length are the same. The network may (be required to) set that the first bit-length and the second bit-length are the same.

In one embodiment, the length of the TCI field may be determined by or associated with one or combination of the followings: (1) the type of TCI state pool where the TCI field is referring or mapping to, and/or (2) the number or amount of activated TCI states from the referred/mapped TCI state pool.

In an implementation 3 of the disclosure, the beam indication may be at least one of the followings: DCI format 1_1; DCI format 1_2; DCI format 0_1; DCI format 0_2; DCI format 1_0; DCI format 0_0; a common or group common DCI format.

In one embodiment, the UE may receive a first beam indication. In one embodiment, the UE may receive a second beam indication. In one embodiment, the UE may receive a third beam indication.

Preferably, the first beam indication, the second beam indication and the third beam indication may be received in different slot.

The first beam indication, the second beam indication and the third beam indication may be signaled via different DCI formats. For example, the first beam indication is delivered via one of the DCI format 1_1 and DCI format 1_2; the second beam indication is delivered via one of the DCI format 0_1 and DCI format 0_2.

When (or if) the UE receives the first beam indication, the UE may perform: (1) applying indicated TCI state(s) from the first beam indication for receiving DL transmission and/or transmitting UL transmission; (2) determining that TCI field(s) indicated/included in the first beam indication are referring/mapping to (activated) TCI state(s) in a joint TCI state pool.

When (or if) the UE receives the second beam indication, the UE may perform: (1) applying indicated TCI state(s) from the second beam indication for (only) transmitting UL transmission; (2) determining or be indicated that TCI field(s) indicated/included in the second beam indication are referring/mapping to (activated) TCI state(s) in a UL-only TCI state pool; (3) determining or be indicated that TCI field(s) indicated/included in the second beam indication are referring/mapping to (activated) TCI state(s) in a joint TCI state pool In one embodiment, the second beam indication may (further) indicate that TCI field(s) indicated/included in the second beam indication are referring/mapping to (activated) TCI state(s) in one of the followings: UL-only TCI state pool or joint TCI state pool.

In one embodiment, the UE may discard/ignore DL RX parameters obtained from TCI state(s) indicated by the second beam indication, when (or if) the UE determines or is indicated that TCI field(s) indicated/included in the second beam indication are referring/mapping to (activated) TCI state(s) in a joint TCI state pool.

In one embodiment, when (or if) the UE receives the third beam indication, the UE may perform: (1) applying indicated TCI state(s) from the third beam indication for (only) receiving DL transmission; (2) determining or be indicated that TCI field(s) indicated/included in the third beam indication are referring/mapping to (activated) TCI state(s) in a DL-only TCI state pool; (3) determining or be indicated that TCI field(s) indicated/included in the third beam indication are referring/mapping to (activated) TCI state(s) in a joint TCI state pool.

In one embodiment, the third beam indication may (further) indicate that TCI field(s) indicated/included in the third beam indication are referring/mapping to (activated) TCI state(s) in one of the followings: DL-only TCI state pool or joint TCI state pool.

In one embodiment, the UE may discard/ignore UL TX parameters obtained from TCI state(s) indicated by the third beam indication, when (or if) the UE determines or is indicated that TCI field(s) indicated/included in the third beam indication are referring/mapping to (activated) TCI state(s) in a joint TCI state pool.

In an implementation 4 of the disclosure, the beam indication may be at least one of the followings: DCI format 1_1; DCI format 1_2; DCI format 0_1; DCI format 0_2; DCI format 1_0; DCI format 0_0; a common or group common DCI format.

In one embodiment, the DCI format may include or indicate a TCI field or a TCI state value.

In one embodiment, one or more TCI codepoints in the TCI field may map to (separately) one or more TCI state(s) applied for both receiving DL transmission and/or transmitting UL transmission.

In one embodiment, one or more TCI codepoints in the TCI field may map to (separately) one or more TCI state(s) applied for (only) transmitting UL transmission.

In one embodiment, one or more TCI codepoints in the TCI field may map to (separately) one or more TCI state(s) applied for (only) receiving DL transmission.

In one embodiment, a first TCI codepoint in the TCI field may map to a first TCI state. The first TCI state may be applied for both receiving DL transmission and/or transmitting UL transmission.

In one embodiment, a second TCI codepoint in the TCI field may map to a second TCI state. The second TCI state may be applied for (only) transmitting UL transmission.

In one embodiment, a third TCI codepoint in the TCI field may map to a third TCI state. The third TCI state may be applied for (only) receiving DL transmission.

In one embodiment, the first TCI state may be a joint TCI state. The first TCI state may be activated or selected from the joint TCI state pool.

In one embodiment, the second TCI state may be a UL-only TCI state. The second TCI state may be activated or selected from the UL-only TCI state pool.

In one embodiment, the third TCI state may be a third TCI state. The third TCI state may be activated or selected from the DL-only TCI state pool.

In one embodiment, the mapping between the first TCI codepoint and the first TCI state may be indicated by a first MAC CE. The first TCI state may be activated or indicated by the first MAC CE.

In one embodiment, the mapping between the second TCI codepoint and the second TCI state may be indicated by a second MAC CE. The second TCI state may be activated or indicated by the second MAC CE.

In one embodiment, the mapping between the third TCI codepoint and the third TCI state may be indicated by a third MAC CE. The third TCI state may be activated or indicated by the third MAC CE.

Preferably, at least two among the first MAC CE, the second MAC CE and the third MAC CE may be the same MAC CE (format).

Preferably, the first MAC CE, the second MAC CE and the third MAC CE may be the same MAC CE (format).

In an implementation 5 of the disclosure, the UE may monitor and/or receive a first beam indication.

In one embodiment, the UE may monitor and/or receive a second beam indication.

In one embodiment, the first beam indication may be applied for both receiving DL transmission and/or transmitting UL transmission. In this case, preferably, the first beam indication may include or indicate a first set of RX parameters for receiving one or more DL transmissions (e.g., channel, RS). In addition, preferably, the first beam indication may include or indicate a first set of TX parameters for transmitting one or more UL transmissions (e.g., channel, RS).

In one embodiment, the first beam indication may be applied for (only) transmitting UL transmission. In this case, the first beam indication may include or indicate a first set of TX parameters for transmitting one or more UL transmissions (e.g., channel, RS).

In one embodiment, the first beam indication may be applied for (only) receiving DL transmission. In this case, preferably, the first beam indication may include or indicate a first set of RX parameters for receiving one or more DL transmissions (e.g., channel, RS).

In one embodiment, the second beam indication may be applied for both receiving DL transmission and/or transmitting UL transmission. Under this case, preferably, the second beam indication may include or indicate a second set of RX parameters for receiving one or more DL transmissions (e.g., channel, RS). In addition, preferably, the second beam indication may include or indicate a second set of TX parameters for transmitting one or more UL transmissions (e.g., channel, RS).

In one embodiment, the second beam indication may be applied for (only) transmitting UL transmission. Under this case, preferably, the second beam indication may include or indicate a second set of TX parameters for transmitting one or more UL transmissions (e.g., channel, RS).

In one embodiment, the second beam indication may be applied for (only) receiving DL transmission. Under this case, preferably, the second beam indication may include or indicate a second set of RX parameters for receiving one or more DL transmissions (e.g., channel, RS).

In one embodiment, when (or if) the UE receives the first beam indication, the UE may perform: (1) applying the first set of RX parameters for receiving one or more configured/indicated DL transmission (e.g., channel, RS), if the first beam indication includes or indicates the first set of RX parameters, and/or (2) applying the first set of TX parameters for transmitting one or more configured/indicated UL transmission (e.g., channel, RS), if the first beam indication includes or indicates the first set of TX parameters.

Preferably, the UE may receive the second beam indication.

Preferably, after the UE receives the first beam indication, the UE may receive the second beam indication.

In one embodiment, when (or if) the UE receives the second beam indication, the UE may perform: (1) applying the second set of RX parameters for receiving one or more configured/indicated DL transmission (e.g., channel, RS), if the second beam indication includes or indicates the second set of RX parameters, and/or (2) applying the second set of TX parameters for transmitting one or more configured/indicated UL transmission (e.g., channel, RS), if the second beam indication includes or indicates the second set of TX parameters (3) discarding or not using the first set of RX parameters for receiving the one or more configured/indicated DL transmission (e.g., channel, RS), if the first beam indication includes or indicates the first set of RX parameters; (4) discarding or not using the first set of TX parameters for transmitting the one or more configured/indicated UL transmission (e.g., channel, RS), if the first beam indication includes or indicates the first set of TX parameters.

FIG. 1 illustrates a block diagram of a node for wireless communication, in accordance with various aspects of the present application. As shown in FIG. 1, a node 100 may include a transceiver 120, a processor 128, a memory 134, one or more presentation components 138, and at least one antenna 136. The node 100 may also include an RF (radio frequency) spectrum band module, a base station communications module, a network communications module, and a system communications management module, Input/Output (I/O) ports, I/O components, and power supply (not explicitly shown in FIG. 1). Each of these components may be in communication with each other, directly or indirectly, over one or more buses 140. In one implementation, the node 100 may be a UE or a base station that performs various functions described in the disclosure.

The transceiver 120 having a transmitter 122 (e.g., transmitting/transmission circuitry) and a receiver 124 (e.g., receiving/reception circuitry) may be configured to transmit and/or receive time and/or frequency resource partitioning information. In some implementations, the transceiver 120 may be configured to transmit in different types of subframes and slots including, but not limited to, usable, non-usable and flexibly usable subframes and slot formats. The transceiver 120 may be configured to receive data and control channels.

The node 100 may include a variety of computer-readable media. Computer-readable media can be any available media that can be accessed by the node 100 and include both volatile and non-volatile media, removable and non-removable media. By way of example, and not limitation, computer-readable media may include computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 134 may include computer-storage media in the form of volatile and/or non-volatile memory. The memory 134 may be removable, non-removable, or a combination thereof. Exemplary memory includes solid-state memory, hard drives, optical-disc drives, etc. As illustrated in FIG. 1, The memory 134 may store computer-readable, computer-executable instructions 132 (e.g., software codes) that are configured to, when executed, cause the processor 128 to perform various functions described in the disclosure. Alternatively, the instructions 132 may not be directly executable by the processor 128 but be configured to cause the node 100 (e.g., when compiled and executed) to perform various functions described in the disclosure.

The processor 128 (e.g., having processing circuitry) may include an intelligent hardware device, e.g., a Central Processing Unit (CPU), a microcontroller, an ASIC, etc. The processor 128 may include memory. The processor 128 may process the data 130 and the instructions 132 received from the memory 134, and information through the transceiver 120, the base band communications module, and/or the network communications module. The processor 128 may also process information to be sent to the transceiver 120 for transmission through the antenna 136, to the network communications module for transmission to a core network.

One or more presentation components 138 presents data indications to a person or other device. Exemplary presentation components 138 include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

Figure 2:
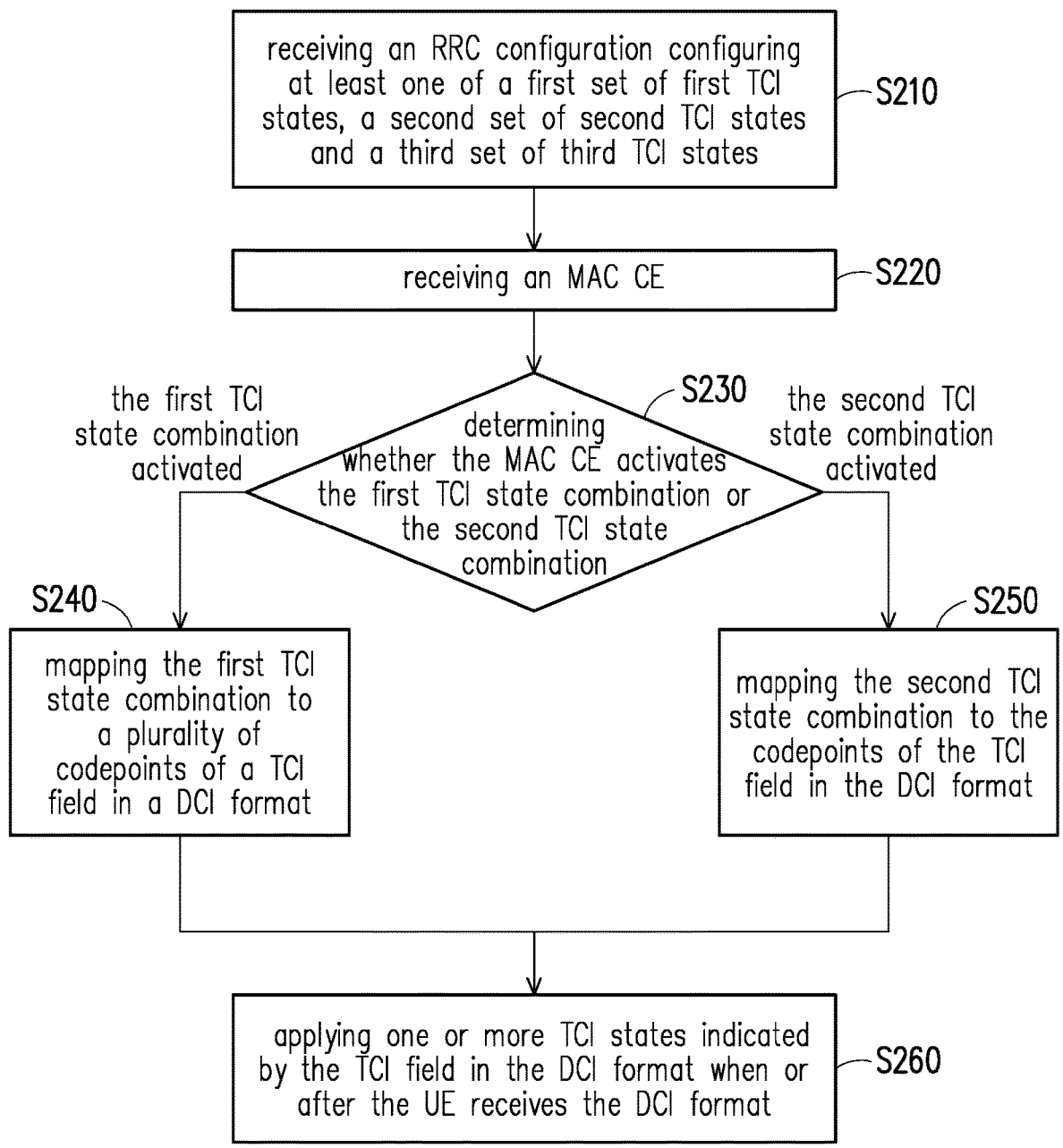
FIG. 2 shows a flow chart of the method for configuring TCI states for the UE according to an embodiment of the disclosure.

See FIG. 2, which shows a flow chart of the method for configuring TCI states for the UE according to an embodiment of the disclosure. The method of this embodiment may be executed by the UE implemented by the node 100 in FIG. 1, and the details of each step in FIG. 2 will be described below.

In step S210, the transceiver 220 receives an RRC configuration configuring at least one of a first set of first TCI states, a second set of second TCI states and a third set of third TCI states. In one embodiment, the transceiver 220 receives the RRC configuration from a network node, which can be the base station/serving cell that currently serves the UE.

In one embodiment, each of the first TCI states is referred to as joint TCI state, which can be used DL transmissions and UL transmissions. In one embodiment, each of the second TCI state is referred to as a UL-only TCI state, which can only be used for UL transmissions. In one embodiment, each of the third TCI state is referred to as a DL-only TCI state, which can only be used for DL transmissions.

In one embodiment, the RRC configuration can configure a particular number of TCI states (e.g., 32/64/128 TCI states), wherein a part of these TCI states can be the first set of first TCI states, another part of these TCI states can be the second set of second TCI states, and the other par of these TCI states can be the third set of third TCI states.

In the embodiments of the disclosure, the descriptions of the joint TCI state, the UL-only TCI state, and the DL-only TCI state can be referred to the above embodiments, which would not be repeated herein.

In step S220, the transceiver 220 receives an MAC CE, wherein the MAC CE activates a first TCI state combination or a second TCI state combination, wherein the first TCI state combination includes a part of the first TCI states, and the second TCI state combination includes at least one of the second TCI states and the third TCI states.

In one embodiment, the MAC CE can be the first MAC CE mentioned in the above. In this case, the MAC CE can be used to activate the first TCI state combination, which includes a part of the first TCI states, i.e., the joint TCI states.

In one embodiment, the MAC CE can be the second MAC CE and/or the third MAC CE mentioned in the above. In the embodiment where the MAC CE is the second MAC CE, the MAC CE can be used to activate the second TCI state combination that only includes the second TCI states. In the embodiment where the MAC CE is the third MAC CE, the MAC CE can be used to activate the second TCI state combination that only includes the third TCI states. In the embodiment where the second MAC CE and the third MAC CE are the same MAC CE received in step S220, the MAC CE can be used to activate the second TCI state combination that includes a part of the second TCI states and a part of the third TCI states.

In step S230, the processor 128 determines whether the MAC CE activates the first TCI state combination or the second TCI state combination.

In a first embodiment, in response to determining that the MAC CE activates the first TCI state combination, the processor 128 performs step S240 to map the first TCI state combination to a plurality of codepoints of a TCI field in a DCI format. In one embodiment, in response to determining that the MAC CE is the first MAC CE activating the first TCI state combination, the processor 128 can map the part of the first TCI states included in the first TCI state combination to the codepoints of the TCI field in a DCI format. In this case, each (TCI) codepoint in the TCI field may map to one TCI state applied for both receiving DL transmission and transmitting UL transmission.

In a second embodiment, in response to determining that the MAC CE activates the second TCI state combination, the processor 128 performs step S250 to map the second TCI state combination to the codepoints of the TCI field in the DCI format. In one embodiment, in response to determining that the MAC CE is the second MAC CE and/or the third MAC CE activating the second TCI state combination, the processor 128 can map the second TCI states and/or the third TCI states included in the second TCI state combination to the codepoints of the TCI field in a DCI format. In this case, each (TCI) codepoint in the TCI field may map to: (1) one TCI state applied for only transmitting UL transmission; (2) one TCI state applied for only receiving DL transmission; (3) a pair of TCI states respectively applied for transmitting UL transmission only and receiving DL transmission only.

In step S260, the processor 128 applies one or more TCI states indicated by the TCI field in the DCI format when or after the UE receives the DCI format.

In the first embodiment, in response to determining that one of the codepoints in the DCI format indicates one of the first TCI states, the processor 128 applies at least one RX parameter for receiving one or more configured/indicated DL transmission. In addition, the processor 128 applies at least one TX parameter for transmitting one or more configured/indicated UL transmission, wherein the one of the first TCI states indicated by the one of the codepoints in the DCI format includes the at least one RX parameter and the at least one TX parameter.

Furthermore, in the first embodiment, the at least one RX parameter and the at least one TX parameter indicate a reference signal index used for transmitting the one or more configured/indicated UL transmission and receiving the one or more configured/indicated DL transmission.

For example, in the first embodiment, if the one of the first TCI states indicated by the one of the codepoints in the DCI format includes a specific reference signal index, a specific reference signal corresponding to the specific reference signal index is used for both of the configured/indicated UL transmission and the configured/indicated DL transmission. In other words, the specific reference signal corresponding to this specific reference signal index is shared by the configured/indicated UL transmission and the configured/indicated DL transmission.

In a first variation of the second embodiment, in response to determining that one of the codepoints in the DCI format indicates the one of the second TCI states, the processor 128 applies at least one TX parameter for transmitting one or more configured/indicated UL transmission, where the one of the second TCI states only includes the TX parameter.

For example, in the first variation of the second embodiment, if the one of the second TCI states indicated by the one of the codepoints in the DCI format includes a first reference signal index, a first reference signal corresponding to the first reference signal index will be used for the configured/indicated UL transmission only.

In a second variation of the second embodiment, in response to determining that one of the codepoints in the DCI format indicates the one of the third TCI states, the processor 128 applies at least one RX parameter for receiving one or more configured/indicated DL transmission, wherein the third TCI state only includes the at least one RX parameter.

For example, in the second variation of the second embodiment, if the one of the third TCI states indicated by the one of the codepoints in the DCI format includes a second reference signal index, a second reference signal corresponding to the second reference signal index will be used for the configured/indicated DL transmission only.

In a third variation of the second embodiment, in response to determining that one of the codepoints in the DCI format indicates the pair of the one of the second TCI state and the one of the third TCI state, the processor 128 applies at least one RX parameter for receiving one or more configured/indicated DL transmission. In addition, the processor 128 applies at least one TX parameter for transmitting one or more configured/indicated UL transmission, wherein the one of the second TCI states only includes the at least one TX parameter, and the third TCI state only includes the at least one RX parameter.

Furthermore, in the third variation of the second embodiment, the at least one RX parameter indicates the first reference signal index for the one or more configured/indicated UL transmission, and the at least one TX parameter indicates the second reference signal index for the one or more configured/indicated DL transmission.

For example, in the third variation of the second embodiment, if the one of the second TCI states and the one of the third TCI states indicated by the one of the codepoints in the DCI format includes the pair of the second reference signal index and the third reference signal index, the second reference signal corresponding to the second reference signal index will be used for the configured/indicated DL transmission only, and the third reference signal corresponding to the third reference signal index will be used for the configured/indicated UL transmission only.

In the third variation of the second embodiment, if the network wants to change the reference signal(s) used for the DL transmission and/or the UL transmission, the network only needs to change the corresponding codepoint in the DCI format. That is, the network does not need to separately change the reference signal(s) used for the DL transmission and/or the UL transmission. Accordingly, the signaling traffic can be reduced.

In summary, in the embodiments of the disclosure, the details about how to exactly use the TCI-based structure for indicating a common beam for various purposes (e.g., both DL/UL, UL (only) or DL (only)) have been introduced. In addition, the embodiments of the disclosure have proposed the exact behavior of switching different TCI state for different purpose as well. Accordingly, efficient beam indication for both DL/UL transmission, UL only transmission, and DL only transmission can be facilitated, and the procedure(s) related to seamlessly switching among different beam indication signaling are also specified.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for configuring transmission configuration indicator (TCI) states performed by a user equipment (UE), the method comprising:
receiving a radio resource control (RRC) configuration for configuring at least one of a first set of first TCI states, a second set of second TCI states, and a third set of third TCI states;
receiving a medium access control (MAC) control element (CE) that activates a first TCI state combination or a second TCI state combination, the first TCI state combination comprising a part of the first set of first TCI states;
in response to determining that the MAC CE activates the first TCI state combination, mapping the first TCI state combination to a plurality of codepoints of a TCI field in a downlink control information (DCI) format; and
in response to determining that the MAC CE activates the second TCI state combination, mapping the second TCI state combination to the plurality of codepoints of the TCI field in the DCI format, wherein each of the plurality of codepoints is mapped to a pair of one second TCI state in the second set of second TCI states and one third TCI state in the third set of third TCI states;
applying a plurality of TCI states indicated by the TCI field in the DCI format in response to receiving the DCI format;
in response to determining that one of the plurality of codepoints in the DCI format indicates the pair of the one second TCI state and the one third TCI state, applying at least one receiving parameter for receiving one or more configured/indicated downlink (DL) transmissions and applying at least one transmitting parameter for transmitting one or more configured/indicated uplink (UL) transmissions, wherein:
the one second TCI state comprises only the at least one transmitting parameter,
the one third TCI state comprises only the at least one receiving parameter,
the at least one receiving parameter indicates a first reference signal index for the one or more configured/indicated DL transmissions, and
the at least one transmitting parameter indicates a second reference signal index for the one or more configured/indicated UL transmissions.

2. The method according to claim 1, further comprising:
in response to determining that one of the plurality of codepoints in the DCI format indicates one of the first set of first TCI states, applying the at least one receiving parameter for receiving the one or more configured/indicated DL transmissions and applying the at least one transmitting parameter for transmitting the one or more configured/indicated UL transmissions, wherein the one of the first set of first TCI states comprises the at least one receiving parameter and the at least one transmitting parameter.

3. The method according to claim 2, wherein the at least one receiving parameter and the at least one transmitting parameter in the one of the first set of first TCI states indicate a third reference signal index used for transmitting the one or more configured/indicated UL transmissions and receiving the one or more configured/indicated DL transmissions.

4. The method according to claim 1, comprising:
in response to determining that one of the plurality of codepoints in the DCI format indicates one of the second set of second TCI states, applying the at least one transmitting parameter for transmitting the one or more configured/indicated UL transmissions, wherein the one of the second set of second TCI states comprises only the at least one transmitting parameter.

5. The method according to claim 1, comprising:
in response to determining that one of the plurality of codepoints in the DCI format indicates one of the third set of third TCI states, applying the at least one receiving parameter for receiving the one or more configured/indicated DL transmissions, wherein the one of the third set of third TCI states comprises only the at least one receiving parameter.

6. The method according to claim 1, wherein each of the first set of first TCI states is referred to as a joint TCI state.

7. The method according to claim 1, wherein each of the second set of second TCI states is referred to as a UL-only TCI state.

8. The method according to claim 1, wherein each of the third set of third TCI states is referred to as a DL-only TCI state.

9. A user equipment (UE), comprising:
a transceiver, configured to:
receive a radio resource control (RRC) configuration for configuring at least one of a first set of first transmission configuration indicator (TCI) states, a second set of second TCI states, and a third set of third TCI states, and
receive a medium access control (MAC) control element (CE) that activates a first TCI state combination or a second TCI state combination, the first TCI state combination comprising a part of the first set of first TCI states;
at least one processor, coupled to the transceiver; and
at least one non-transitory computer-readable medium coupled to the at least one processor and storing one or more computer-executable instructions that, when executed by the at least one processor, cause the UE to:
in response to determining that the MAC CE activates the first TCI state combination, map the first TCI state combination to a plurality of codepoints of a TCI field in a downlink control information (DCI) format;
in response to determining that the MAC CE activates the second TCI state combination, map the second TCI state combination to the plurality of codepoints of the TCI field in the DCI format, wherein each of the plurality of codepoints is mapped to a pair of one second TCI state in the second set of second TCI states and one third TCI state in the third set of third TCI states;
apply a plurality of TCI states indicated by the TCI field in the DCI format in response to receiving the DCI format; and
in response to determining that one of the plurality of codepoints in the DCI format indicates the pair of the one second TCI state and the one third TCI state, apply at least one receiving parameter for receiving one or more configured/indicated downlink (DL) transmissions and apply at least one transmitting parameter for transmitting one or more configured/indicated uplink (UL) transmissions, wherein:

the one second TCI state comprises only the at least one transmitting parameter, the one third TCI state comprises only the at least one receiving parameter, the at least one receiving parameter indicates a first reference signal index for the one or more configured/indicated DL transmissions, and the at least one transmitting parameter indicates a second reference signal index for the one or more configured/indicated UL transmissions.

10. The UE according to claim 9, wherein the one or more computer-executable instructions, when executed by the at least one processor, further cause the UE to:

in response to determining that one of the plurality of codepoints in the DCI format indicates one of the first set of first TCI states, apply the at least one receiving parameter for receiving the one or more configured/indicated DL transmissions and apply the at least one transmitting parameter for transmitting one or more configured/indicated UL transmissions, wherein the one of the first set of first TCI states comprises the at least one receiving parameter and the at least one transmitting parameter.

11. The UE according to claim 10, wherein the at least one receiving parameter and the at least one transmitting parameter in the one of the first set of first TCI states indicate a third reference signal index used for transmitting the one or more configured/indicated UL transmissions and receiving the one or more configured/indicated DL transmissions.

12. The UE according to claim 9, wherein the one or more computer-executable instructions, when executed by the at least one processor, further cause the UE to:

in response to determining that one of the plurality of codepoints in the DCI format indicates one of the second set of second TCI states, apply the at least one transmitting parameter for transmitting the one or more configured/indicated UL transmissions, wherein the one of the second set of second TCI states comprises only the at least one transmitting parameter.

13. The UE according to claim 9, wherein the one or more computer-executable instructions, when executed by the at least one processor, further cause the UE to:

in response to determining that one of the plurality of codepoints in the DCI format indicates one of the third set of third TCI states, apply the at least one receiving parameter for receiving the one or more configured/indicated DL transmissions, wherein the one of the third set of third TCI states comprises only the at least one receiving parameter.

14. The UE according to claim 9, wherein each of the first set of first TCI states is referred to as a joint TCI state.

15. The UE according to claim 9, wherein each of the second set of second TCI states is referred to as a UL-only TCI state.

16. The UE according to claim 9, wherein each of the third set of third TCI states is referred to as a DL-only TCI state.

* * * * *